May 25, 1937.   G. A. LYON   2,081,592
STEERING WHEEL CONSTRUCTION
Filed June 22, 1934   4 Sheets-Sheet 1
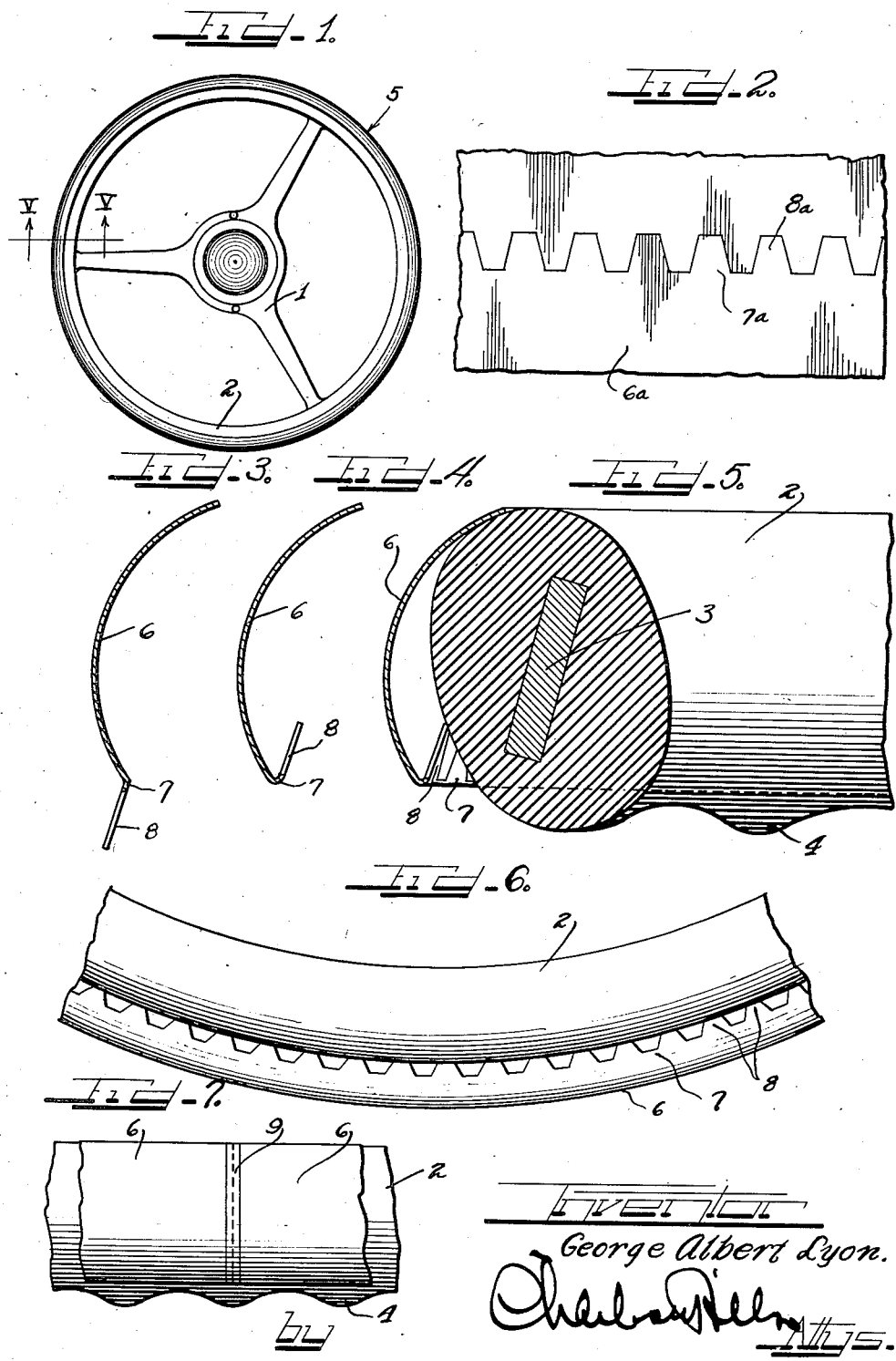

May 25, 1937.  G. A. LYON  2,081,592
STEERING WHEEL CONSTRUCTION
Filed June 22, 1934    4 Sheets-Sheet 2
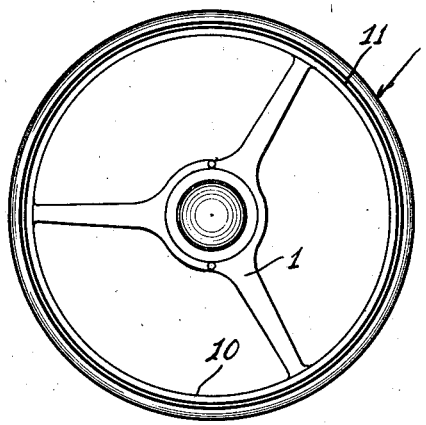
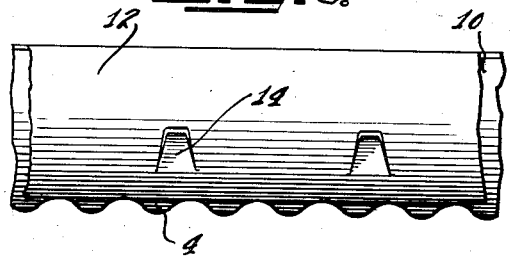
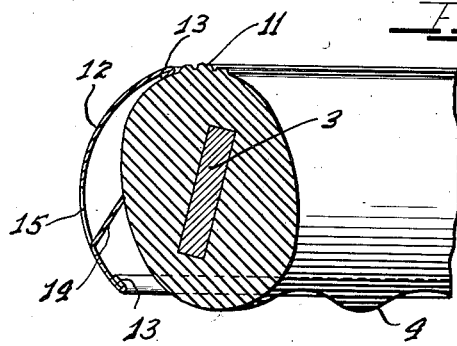
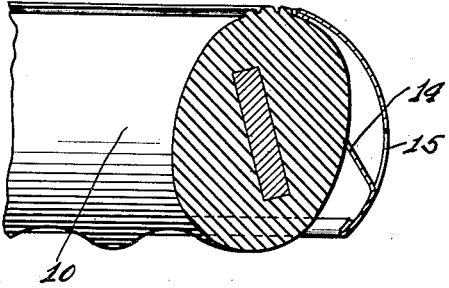
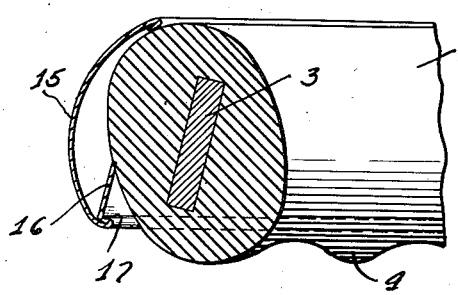
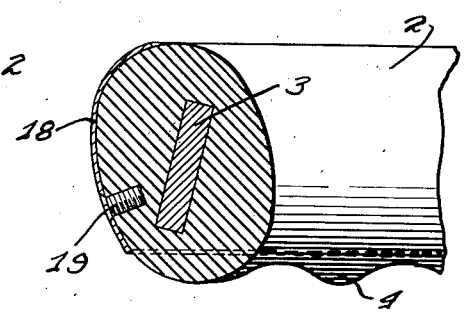
Inventor
George Albert Lyon.
by Charles Hill
Attys.

May 25, 1937. G. A. LYON 2,081,592
STEERING WHEEL CONSTRUCTION
Filed June 22, 1934 4 Sheets-Sheet 3
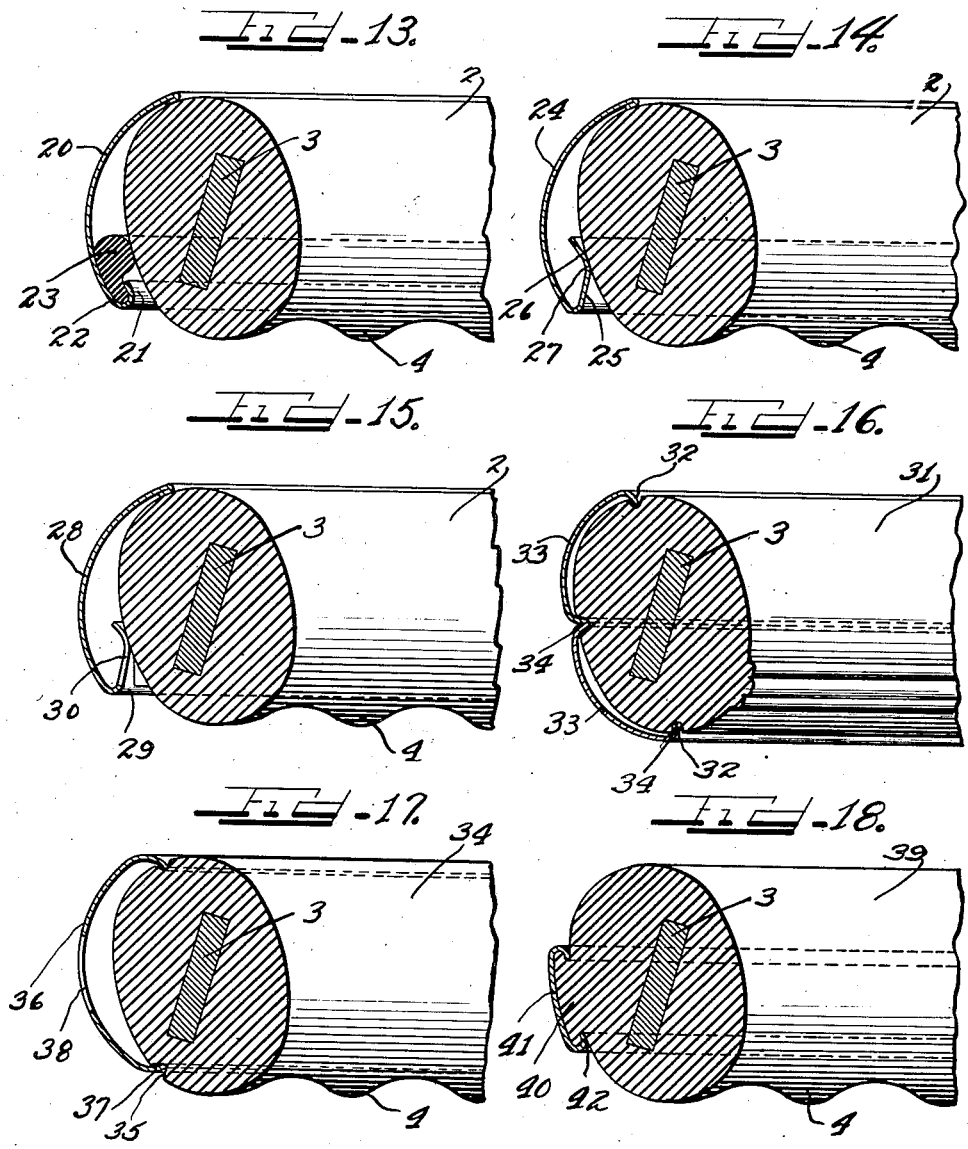

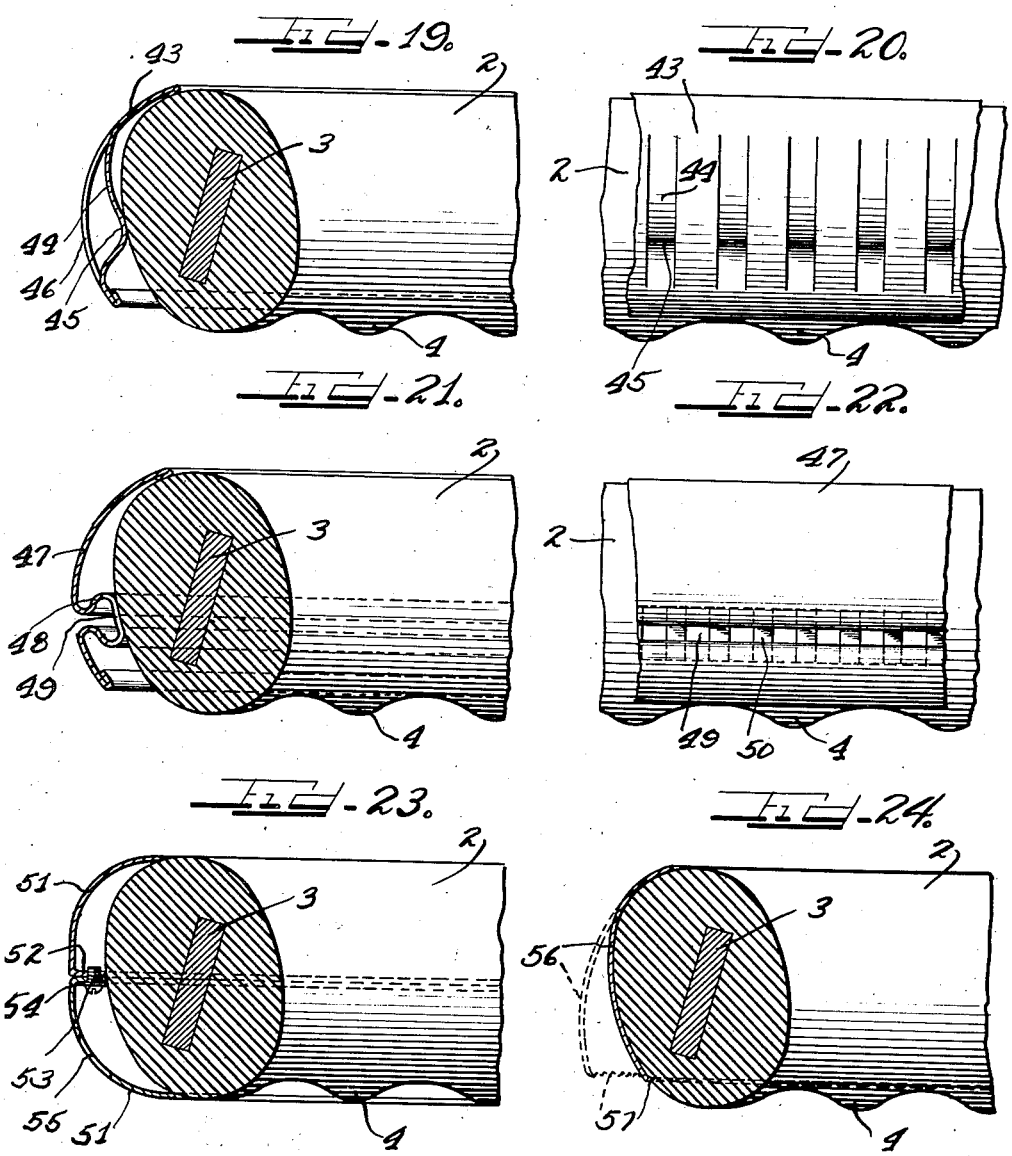

Patented May 25, 1937

2,081,592

UNITED STATES PATENT OFFICE 2,081,592

STEERING WHEEL CONSTRUCTION

George Albert Lyon, Allenhurst, N. J.

Application June 22, 1934, Serial No. 731,805

9 Claims. (Cl. 74—552)

This invention relates to improvements in steering wheel construction, highly desirable for use in connection with steering wheels and wheels of similar character for guiding or controlling vehicles or other mechanism, or parts thereof, although the invention may have other and various features and purposes as will be apparent to one skilled in the art.

More specifically, the invention relates to a steering wheel construction including a wheel rim made of any desirable material, to the external surface of which is attached a ring, band, bead or the like of metal or equivalent structure.

In the past, steering wheels and similar devices have been made of many and various materials but, for the most part, steering wheels have been made of hard rubber or a rubber composition with or without a metallic core, wood, and, in some instances, metal. The particular design of steering wheels and the like, and their inherent characteristics, have been determined to a very great extent by economy of manufacture. For example, an all metal wheel is prohibitively expensive for most uses, and a wooden wheel is prohibitively expensive for use in connection with medium and low priced automotive vehicles, for example. Consequently, due to the exigencies of economical manufacture, by far the greater number of such wheels now in use are made of hard rubber or a rubber composition.

The heretofore known wheels of this character have been subject to many objectionable qualities, both in construction and in their use, which objectionable features could not be eliminated or improved upon because of the expense involved. For example, if an all metal wheel was used in a vehicle, this wheel would not harmonize with the other metallic appointments of the interior of the vehicle. In addition, such a wheel would be too heavy, would prove tiresome to a user, and would be too hard for comfort.

Wooden wheels, most frequently used on the more expensive vehicles, due to the cost of manufacture, are also open to many objections. A wooden wheel will not match or harmonize with other interior appointments of the vehicle. The covering used to finish the surface of the wheel, such as enamel, shellac, varnish or the like wears off after relatively short usage and leaves not only an unsightly appearance but a surface very uncomfortable to the hands of a user. Such a wheel also absorbs moisture from the hands, becoming grimy after relatively short usage, and cannot be cleansed with any degree of satisfaction.

A hard rubber or rubber composition wheel is perhaps the most objectionable, but nevertheless the most in use. Such a wheel is usually made of such a small cross sectional area as to be very uncomfortable to the hands. In addition, whatever finish can be placed upon this wheel is only temporary and the wheel very shortly presents a sticky, tacky feeling when handled, causing the driver or user to be intermittently removing his hands from the wheel to comfort, rest or wipe them, a practice highly dangerous to himself and other occupants of the vehicle. Both the wooden and hard rubber wheels are subject to this sticky, tacky feeling, and neither can be used, even for a very short length of time, without the hands of the user becoming decidedly unclean. Furthermore, these wheels become uncomfortably warm at times, do not slide readily through the hands of the user and have a decided tendency to stick on those occasions when it is necessary to spin the wheel.

With the foregoing in mind, it is accordingly an object of the present invention to provide a steering wheel construction presenting a smooth, clean surface to the contact of the hands and maintaining such smoothness and cleanliness through prolonged usage.

Another object of this invention is the provision of a steering wheel construction having the above characteristics and which is very economical to manufacture.

Still another object of the invention is the provision of a steering wheel construction possessing the aforesaid advantages and of which the wheel portion per se may be made of any suitable material such as metal, wood, rubber composition or other suitable material.

It is also a feature of this invention to provide a composite steering wheel construction including a steering wheel of usual type with a covering thereon that may readily be made to ornament the wheel and harmonize with the other interior appointments of the vehicle.

A further object of this invention is the provision of metallic means for covering an exterior portion of a steering wheel to present a clean, smooth feeling to the hands of the user and enhance the appearance of the composite steering wheel construction.

It is also an object of this invention to provide means for attachment to a steering wheel, which means thicken the composite structure after attachment, affording a comfortable grip somewhat resilient in character when squeezed, but more than amply firm and rigid for proper handling of the wheel.

Still another aim of this invention is the provision of means mountable on a steering wheel and capable of presenting a smooth, clean surface for contact with the hands of the user, said means being spaced somewhat from the wheel to thicken the gripping area, and said means being provided with ventilating characteristics to prevent the gripping surface from becoming unduly warm.

In addition, the present invention also provides a metallic ring, band, bead or the like for attachment to an external surface of a steering wheel, the attached member providing a smooth, clean surface for contact by the hands of the user and also enhancing the appearance of the wheel.

The invention also contemplates the provision of a new and novel construction in an ornamental member, bead-like in character, for attachment to objects.

A further aim of this invention is the provision of a decorative member affording smooth contact with the hands of the user for attachment to an external surface of a steering wheel, there being means incorporated to prevent turning of the member relatively to the wheel.

Still a further object of this invention is the provision of a steering wheel construction including a steering wheel of any suitable material and a member attached to an external surface thereof, said member being of metal or equivalent material and providing a smooth, clean surface for contact by the hands of the user; the composite steering wheel construction being mountable in either of the following ways:

(1) The member being mounted upon the steering wheel at the factory contingent with the manufacture of the steering wheel, or the vehicle or mechanism with which it is associated, or purchased as an accessory and attached at any desirable time, but being non-removable after attachment.

(2) The member being substantially of an accessory type made so as not to injure the surface of the wheel during attachment, and attachable and removable at will.

(3) The member being non-removable after attachment, and being attached at a factory by rolling, pressing, or spinning the member into proper engagement with a steering wheel especially formed to receive the member.

Still a further aim of the invention is the provision of a metallic annular member for association with a steering wheel, said member being provided with a paint or finish of a character to eliminate heat absorption by the member.

Another object of the invention is the provision of a new and novel method of making a ring, band, bead, annular member or the like for attachment to the external surface of an object.

While some of the more salient features, characteristics and advantages of the present invention have been above pointed out, others will become apparent from the following disclosures.

The invention includes these and other features of construction, combinations of parts, and process steps, hereinafter described and shown in a preferred form, and several different modifications, in the drawings, as more particularly indicated by the claims.

On the drawings:

Figure 1 is a plan view of a composite steering wheel construction embodying principles of the present invention, the construction being of the character used in automotive vehicles, and comprising a steering wheel of either special or standard construction with a member attached to the external surface thereof.

Figure 2 is a fragmentary enlarged plan view illustrating a step in the method of making the member prior to its attachment to the wheel rim.

Figure 3 is an enlarged vertical sectional view illustrating a further step in the method of making the member.

Figure 4 is a view similar to Figure 3 illustrating an advanced step in the method of making the member.

Figure 5 is an enlarged vertical sectional view through the composite steering wheel construction taken substantially as indicated by line V—V of Figure 1.

Figure 6 is a fragmentary bottom plan view of the composite steering wheel construction.

Figure 7 is a fragmentary elevational view of the composite steering wheel construction, illustrating one form of attachment for the ends of the member.

Figure 8 is a plan view similar to Figure 1, showing the application of a bead-like member to a steering wheel having concentric beads in the top surface thereof.

Figure 9 is an enlarged fragmentary outside elevational view of a different form of member permanently attached to the wheel rim.

Figure 10 is an enlarged fragmentary transverse sectional view of the structure shown in Figure 9.

Figure 11 is a fragmentary transverse vertical sectional view similar to Figure 10 showing the permanent application of another form of member.

Figure 12 is a view similar to Figure 11 showing a still different form of member for substantially permanent application to a wheel rim.

Figure 13 is a fragmentary vertical sectional view illustrating a wheel rim with a removable member attached thereto.

Figure 14 is a view similar to Figure 13 illustrating a different form of removable member.

Figure 15 is a view similar to Figures 13 and 14 illustrating a still different form of removable member.

Figure 16 is a fragmentary vertical sectional view of a composite steering wheel construction with a specially formed wheel rim, the composite construction being completed at the factory.

Figure 17 is a view similar to Figure 16 showing a different form of member permanently attached at the factory to a specially formed wheel rim.

Figure 18 is a view similar to Figures 16 and 17 showing a still different form of member and wheel rim.

Figure 19 is a view similar to Figures 13 and 15 showing a composite steering wheel construction to which the attached member is removable and replaceable at will.

Figure 20 is a fragmentary outside elevational view of the structure shown in Figure 19.

Figure 21 is a view similar to Figure 19 showing a still different form of attached member removable and replaceable at will.

Figure 22 is a fragmentary outside elevational view of the structure shown in Figure 21.

Figure 23 is a fragmentary vertical sectional view of a composite steering wheel construction in which the attached member is of a dual nature, but which member may be attached at any desirable time, the attachment being somewhat semi-permanent in nature.

Figure 24 is a fragmentary vertical sectional view of a composite steering wheel construction illustrating a still different form of member permanently attached to the steering wheel and showing the method of attachment.

As shown on the drawings:

At the outset, it may be best to note that the plan views of Figures 1 and 8 are equally illustrative of the composite steering wheel construction shown in practically all of the other views, with the possible exception of views shown in Figures 12, 18, 19, 20 and 24. These latterly mentioned figures illustrate constructions which are in plan substantially the same, except for obvious variations, but it is not deemed necessary herein to illustrate these constructions in kind.

It is also to be understood that while in each instance in the drawings, the composite steering wheel construction is disclosed as including a wheel rim with a completely annular bead, band, ring or the like disposed therearound, it will be obvious that such attached member may or may not have the ends thereof secured together to form a complete ring-like structure, and it is equally obvious that such member need not extend entirely around the periphery of the wheel rim but merely, if so desired, be in one or more annular portions with spaces therebetween, depending upon the exigencies of circumstances.

The composite structure illustrated in Figures 1 to 7 inclusive, comprises a steering wheel 1, which may be of standard construction, having a wheel rim 2, which, in this instance, is formed as usual with a metallic core 3 and a hard rubber composition molded around the core. The wheel rim is somewhat oval in cross-section, and along the undersurface thereof is provided with the well-known finger humps 4.

To the wheel rim 2 there is attached an annular member, generally indicated in Figure 1 by numeral 5, the same being in the form of a ring, band, bead or, as will more fully appear later herein, a member of similar nature completely annular or otherwise. This member is preferably of metal and polished or decorated in keeping with the interior appointments of the vehicle with which it is associated. It is further formed so that it may engage with substantially equal adaptability over any suitable material for the forming of steering wheel rims.

As shown more clearly in Figure 5, it will be seen that the member comprises an outer bead-like portion 6, the upper edge of which engages intimately with the upper surface of the wheel rim 2. The portion 6 curves outwardly and downwardly in spaced relationship to the wheel rim 2 and terminates in an inwardly turned marginal portion 7 having spaced teeth or projections 8 disposed therearound. The inwardly turned portion is sloping towards the wheel rim so that the ends of the teeth 8 contact with the wheel rim at an angle, and since the normal diameter of the ring including the inner ends of the teeth is slightly less than the diameter of the wheel rim against which they contact, a resilient engagement between the teeth and the wheel rim is effected and the teeth tend to bite into the wheel rim. Upon the application of pressure tending to force the member 5 off the wheel rim, the teeth will tend to bite more securely into the wheel rim, the contact of the teeth and wheel rim being below the maximum outside diameter of the wheel rim, as clearly shown in Figure 5. As indicated in Figure 7, if so desired, the ends of the member 5 may be welded, brazed or otherwise secured together as indicated at 9.

In applying the member 5 to the wheel rim, it is a simple expedient to force the member downwardly over the wheel rim until the upper edge of the portion 6 contacts intimately with an upper surface of the wheel rim, such application causing the resilient engagement between the teeth and the wheel rim. Obviously, the side edges of the teeth will prevent the member 5 from turning relatively to the wheel rim. Of course, the composite structure shown in Figures 1, 5, 6 and 7 is of a substantially permanent nature, it being practically impossible to remove the annular member from the wheel rim without mutilation of the annular member or without injury to the wheel rim. However, it will be noted that the annular member may be applied to the wheel rim either at the factory, during the installation of the steering wheel or the building of the vehicle, or it might be purchased separately as an accessory and applied to the wheel rim in the manner mentioned above.

As seen in Figures 5 and 7, the annular member, while enlarging the gripping area, also affords smooth and clean surfaces for contact with the hands of the user. At the same time, this member does not interfere with engagement of the hands of the user with the finger humps 4 upon the wheel rim when such emergency arises as necessitates the use of these humps. The composite structure provides a firm and positive hold for the hands of the user, while at the same time the hardness and weight of solid metal is eliminated. Upon a squeezing pressure of the hand of the user, there will be a slight give or resiliency in the portion 6 due to the resiliency of the inwardly turned marginal portion 7. Another feature of the composite construction is the elimination of a dead air space, which might be productive of an undesirable temperature in the composite structure, since air may freely circulate beneath the annular member through the spaces between the teeth 8.

In addition to the above, in the event it is not desirable or necessary to polish or otherwise decorate the annular member in keeping with the interior appointments of the vehicle, this member may be given a light, preferably white, finish, such as paint or the like, to eliminate heat absorption to a great extent. This will insure the hands of the user having a cool, clean surface for contact.

The annular member disclosed in Figures 1, 5, 6 and 7 lends itself to a novel and economical method of making the same. Initially, a sheet of flat stock is used, substantially the width of two annular members in flat form. As seen in Figure 2, this stock is cut through the center by a staggered line forming alternate teeth, each alternate tooth being upon an opposite piece of stock. Consequently, one annular member may be made from each of the flat sections, each section constituting a portion 6a, a portion 7a, and teeth 8a, corresponding respectively in the finished member to the outer portion 6, the inwardly turned marginal portion 7 and the teeth 8. It is obvious that with such cutting, there is no waste of stock.

After a member is cut in the flat, it is next run through suitable rolling mechanism wherein the portion 6 is made arcuate, leaving the marginal portion 7 together with the teeth 8 projecting at a backward angle to the portion 6. If so desired, the strip of stock may be continued through a rolling mechanism and the marginal portion 7 bent inwardly in proper position for application, thus finishing the annular member, except for polishing or the desired decoration. Of course, the ends of the member may be secured together as explained above.

It is contemplated using a long strip of stock, and when the same passes through the rolling mechanism, it will assume a spiral formation upon leaving the rolling mechanism. It can then be cut off into portions of suitable lengths and will already have a tendency to assume circular form.

A variation in the making of this annular member with substantially equal facility may also be adopted. After the initial rolling step; namely, the arcing of the portion 6, the strip might then be cut into desired lengths to form a member, the ends of the strip being secured together or not, as may be desired, and the marginal portion 7 folded inwardly in a press operation. Of course, it is apparent that either way of making the strip is not only rapid and labor saving, but exceedingly economical.

In Figures 8 to 24, inclusive, I have shown several different forms of annular members associated with a steering wheel rim to form a composite structure. From the foregoing description, the methods of making the subsequently described members will be obvious. Furthermore, the various structures shown in Figures 8 to 24, inclusive, possess substantially the same advantages as hereinabove mentioned. Consequently, it is only necessary to mention the details of construction in connection with the embodiments described hereinafter.

In Figure 8, I have duplicated the steering wheel 1 with the exception that this wheel is provided with a wheel rim 10 made around a core 3, and having the finger humps 4 as above described, but also being provided with integrally formed ribs 11 in the upper portion thereof. This figure illustrates the application of the various annular members to a wheel rim of this type, showing plainly that the application of an annular member does not interfere in any manner with either the finger humps 4 or the ribs 11 and their usages. In Figure 8, an annular member, generally indicated for the purpose of convenience as 5a, is shown attached to the wheel rim to form a composite structure.

In Figures 9 and 10, one form of the annular member 5a is shown in detail. It will be seen that this member includes an outer arcuate portion 12 in spaced relationship to the wheel rim 10 when associated therewith, and each marginal edge of this member is turned inwardly as at 13 to leave no sharp edges. The inwardly turned portions 13 preferably contact intimately with the wheel rim 10, one edge just short of the ribs 11 and the other edge just above the finger humps 4. At spaced intervals therealong tooth-like members 14 are struck inwardly from the body of the portion 12, each so formed tooth leaving an aperture 15 in the body portion 12 providing adequate ventilation in the area between the portion 12 and the wheel rim. As seen clearly in Figure 10, the teeth 14 are disposed at an angle to the wheel rim below the maximum outside diameter of the wheel rim, and the upper margin of the portion 12 is disposed inwardly above the said maximum diameter. With such construction, the teeth tend to bite into the wheel rim and thus maintain the annular member in fixed relationship to the wheel rim.

The structure shown in Figures 9 and 10 is of a substantially permanent nature and may be built up either at the factory or at any convenient time. The annular member is applied to the wheel rim by pressing the same thereover until the upper margin of the portion 12 sets firmly upon the upper surface of the wheel rim.

In Figure 11, a substantially permanent composite structure is also shown including a wheel rim 2 of the character shown in Figures 1, 5, 6 and 7. In this instance, the annular member comprises an arcuate outer portion 15 spaced from the wheel rim, except for the upper edge thereof which contacts the wheel rim above the maximum outside diameter thereof, and which normally conceals an inwardly turned flange or marginal portion 16 disposed at such an angle that the relatively sharp edge thereof engages the wheel rim. This engagement is, of course, below the maximum outside diameter of the wheel rim so that this marginal portion will tend to bite into the wheel rim. The marginal portion 16 is formed in this instance by means of a substantially double fold 17, one portion of the fold lying intimately against the portion 15 and having substantially the same curvature, and then a reverse bend is applied disposing the marginal portion 16 at an angle for secure engagement.

In Figure 12, a simplified, substantially permanent construction is shown in which an annular band 18 shaped in conformity with the external surface of the wheel rim 2 is held in substantially intimate engagement throughout its entire inner surface with the wheel rim by means of spaced stud screws 19. Of course, countersunk openings are provided for the heads of the stud screws so that the exterior surface of the composite structure will be clean and smooth to the hands.

In Figure 13, a composite structure is shown in which the annular element is removable and replaceable at any desired time. The composite structure may be completely formed at the factory, or the annular element may be purchased as an accessory and applied and removed at will. The annular member comprises an outwardly arched portion 20 with an inwardly folded upper margin resting against the upper surface of the wheel rim 2, and the remainder of the member spaced from the wheel rim. The lower margin of the portion 20 is in the nature of a rounded fold 21 tightly embracing a relatively slender shank 22 integrally formed on a resilient ring 23 made of rubber or equivalent material. The ring 23 is of a sufficient normal diameter to more than fill the space between the portion 20 and the wheel rim, so that when the annular member is pressed over the wheel rim, the rubber ring 23 will be distorted and caused to tightly grip the wheel rim. The gripping action occurs beneath the maximum outside diameter of the wheel rim and firmly holds the annular member thereupon. However, the annular member may be removed by forcing the same upwardly off of the wheel rim, and removals and replacements of this member will result in no injury either to the member or the wheel rim.

Another composite construction in which the annular member is removable is shown in Figure 14. In this instance, the annular member includes an outwardly arced portion 24 terminating in the lower portion thereof in a rounded fold producing an inwardly turned and normally concealed marginal portion 25. The uppermost part of the portion 25 is outwardly bent, as indicated at 26, to prevent contact of the relatively sharp portion of the inner marginal portion with the wheel rim, thus forming an inwardly projecting bead 27 for contacting the wheel rim. Of course, the inwardly turned marginal portion 25 is resilient in character and the engagement between the wheel rim and the bead 27 is such as to permit removal and replacement without injury to any of the parts.

In Figure 15, I have shown a construction similar to that shown in Figure 14, the annular member including an outwardly arced portion 28 and an inwardly turned marginal portion 29 having a plurality of spaced teeth 30 therearound. The teeth 30 are shaped substantially the same as the inner marginal portion 25 of Figure 14. The spaces between the teeth 30 provided adequate ventilation of the interior of the annular member, and the application and removal of the annular member is obvious.

In Figure 16, I have a shown a permanent construction which must be built up at the factory. In this instance, a specially formed wheel rim 31 is utilized, this rim having a plurality of spaced grooves 32 formed in the external surface thereof, the annular member being in the form of two annular shells 33, each outwardly arced and each provided with a pair of inwardly turned margins 34 seated in the grooves 32. The two confronting margins 34 are seated in the same central groove 32. The two annular shells 33 are secured to the wheel rim by any suitable well-known rolling or spinning process.

Another factory-built permanent construction composite structure is shown in Figure 17 which also includes a specially formed wheel rim 34 provided with a pair of spaced grooves 35. The annular member includes an outwardly arced portion 36 normally in spaced relationship to the wheel rim, and inwardly bent marginal portions 37 are engaged in the grooves 35. This annular member is also rolled or spun upon the wheel rim. The annular member is further provided with one or more ventilation apertures 38 to eliminate a dead air space between the annular member and the wheel rim.

Still another factory-built composite structure is shown in Figure 18 in which is used a specially formed wheel rim 39 having a relatively narrow annular projection 40 on the outer surface thereof. This projection 40 is preferably substantially T-shaped in cross-section. The annular member in this instance is in the form of a closely fitting band 41 having a pair of inwardly turned marginal portions 42 formed around the upper and lower projecting annular beads of the part 40. The band 41 is also attached by a rolling or spinning process.

In Figures 19 and 20, another composite structure is shown in which the annular member is removable from and replaceable on the wheel rim 2. The annular member includes an outwardly arcuate portion 43 spaced from the wheel rim 2 except for the upper and lower edges thereof. Struck inwardly at spaced intervals from the body of the portion 43 are a plurality of gripping members 44. Each of these gripping members is bent inwardly and provided with a rounded reverse bend 45 for resilient gripping engagement with the surface of the wheel rim. The formation of each gripping member provides an aperture 46 suitable for ventilating purposes, and these apertures fully insure easy and positive gripping of the steering wheel structure without interfering to an undue extent with sliding the wheel through the hands.

A somewhat similar composite structure in which the annular member is removable and replaceable is shown in Figures 21 and 22. In this instance, the annular member includes an outwardly arced portion 47 having in the lower part thereof an integral inward fold 48 of substantially a rounded T-shape in cross section. Prior to the folding or forming of the member, spaced apertures 49 are provided in the part to be folded innermost, leaving spaced grippers 50 for resilient gripping engagement with the surface of the wheel rim 2. Together with the annular groove formed in the member by means of the fold and the apertures 49, adequate ventilation is provided.

Figure 23 illustrates a different formation and attachment of an annular member to a wheel rim 2 to form a composite construction. The annular member includes a pair of annular shells disposed one above the other in complemental relationship, each shell being arcuate and the outer portion thereof extending substantially radially inward into contact with the wheel rim 2. The inward portion, adjacent the central part of the wheel rim, of each shell, is bent inwardly at substantially right angles, as indicated at 52. The inner edges of the inwardly turned margins 52 may or may not contact with the outer surface of the wheel rim, as may be desired. The annular members are held in position upon the wheel rim by means of stud bolts 53 threadedly engaged in the confronting flanges 52. A lock washer 54 in each such bolt connection insures securement of the parts. Access to each of the stud bolts 53 is provided through a correspondingly located aperture 55 in the lower shell sufficiently large for the insertion of a screw driver or like implement.

Still another permanent composite structure, factory-built, is shown in Figure 24, wherein the annular member is in the form of a band 56 intimately fitting the outer surface of the wheel rim 2. As indicated in dotted lines in this figure, the band is initially laid against the wheel rim with the upper surface of the band only in contact, and then with suitable pressing or rolling mechanisms, the band is shaped in conformity with the outer surface of the wheel rim. Due to its annular character, the band will obviously remain in position. The lower edge of the band is preferably provided with saw teeth or the like 57, the edges of which will tend to engage or bite into the wheel rim and prevent relative rotation of the band with respect to the wheel rim. Of course, the teeth are disposed sufficiently beneath the major portion of the wheel rim to be normally out of contact with the hands of the user, and the outer parts of these saw teeth may be smoothed in a well-known manner to prevent injury to the hands of the user in the event of contact.

From the foregoing, it will be apparent that I have provided a simple and extremely economical composite steering wheel structure which may be formed with the utilization of a steering wheel of substantially any suitable material. The composite structure presents a smooth and clean contact for the hands of the user and the composite structure may be formed in many convenient shapes and sizes, permanent or nonpermanent in character. It will be further apparent that the invention herein set forth includes new and novel annular members or the like for attachment to objects and new methods of making the same.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. A steering wheel construction, including a wheel rim, a metallic member disposed around the outer upper surface of said rim in position to be contacted by the hands of a user of said steering wheel, and inwardly turned means on said member to effect a gripping engagement on said rim.

2. A steering wheel construction, including a non-metallic wheel rim, an annular metallic member overlying the upper and outer portion of said wheel rim, and inwardly projecting means on said metallic member to effect a resilient gripping engagement with said rim at a substantially under point on said rim.

3. In a composite steering wheel construction, a wheel rim having a transverse curvature, an annular metallic member on said rim in position to be contacted by the hands of a user, an edge of said member engaging said rim on one side of the maximum outside diameter thereof, the body portion of said member being spaced from said rim, and resilient means associated with said member and extending therebeneath for engagement with said rim on the other side of said maximum diameter.

4. In a composite steering wheel structure, a wheel rim having a transverse curvature, an annular member associated with said rim in position to be contacted by the hands of a user, said member including an outer covering portion and an inwardly turned portion disposed at an angle to said outer portion to grippingly engage said rim, said outer portion and said inwardly turned portion engaging said rim respectively on opposite sides of the maximum outside diameter of said rim.

5. In a composite steering wheel construction, a wheel rim having a transverse curvature, and a transversely arcuate annular metallic member on said rim in position to be contacted by the hands of a user, said member including an outer portion arranged to contact said rim on one side of the maximum outside diameter thereof, and an inwardly turned marginal portion extending at an angle from said outer portion and arranged to bitingly engage said rim on the other side of said maximum diameter, whereby said member may be associated with said rim at any time but once associated therewith the connection is permanent.

6. In a composite steering wheel structure, a wheel rim having a transverse curvature, an annular metallic member on said wheel rim having an outer transversely arcuate portion engaging said wheel rim on one side of the maximum diameter thereof, and an inner portion carried by said outer portion and shaped for resilient relatively smooth gripping contact with said rim on the other side of said maximum diameter, whereby said member may be removed and replaced as desired.

7. In a composite steering wheel structure, a wheel rim curved in cross-section, an arcuate metallic member on said wheel rim in position to be grasped by the hands of a user but leaving the undersurface of said wheel rim free, said member including an outer portion contacting said rim above the maximum outside diameter of the rim and curving outwardly and downwardly in spaced relationship to said rim, an inwardly turned marginal portion on said outer portion disposed at an angle thereto and engaging said rim below said maximum diameter, and spaced teeth on said marginal portion tending to bite into said rim to resist removal of said member.

8. In a composite steering wheel structure, a wheel rim curved in cross-section, an annular metallic transversely arcuate member on said rim, said member engaging said rim above the maximum outside diameter of said rim, and tooth-like lugs struck inwardly from said member to engage said rim at an angle thereto, said lugs extending towards but engaging said rim below said maximum diameter to hold said member on said rim.

9. In a composite steering wheel construction, a wheel rim having a transverse curvature, an annular metallic member on said rim also having a transverse curvature, one edge of said member engaging said rim on one side of the maximum outside diameter thereof, and an inwardly turned margin on said member to resiliently grip said rim on the other side of said maximum diameter, said margin having the innermost portion thereof backwardly bent away from said rim to provide a smooth gripping bead.

GEORGE ALBERT LYON.